United States Patent [19]
Abe

[11] Patent Number: 5,739,958
[45] Date of Patent: Apr. 14, 1998

[54] MICROSCOPE OBJECTIVE LENS SYSTEM WITH CORRECTION RING

[75] Inventor: Katsuyuki Abe, Hachioji, Japan

[73] Assignee: Olympus Optical Co., Ltd., Tokyo, Japan

[21] Appl. No.: 544,311

[22] Filed: Oct. 17, 1995

[30] Foreign Application Priority Data

Oct. 17, 1994 [JP] Japan .................. 6-250783

[51] Int. Cl.$^6$ .................. G02B 21/02
[52] U.S. Cl. .................. 359/660; 359/657; 359/658
[58] Field of Search .................. 359/656, 657, 359/658, 659, 660

[56] References Cited

U.S. PATENT DOCUMENTS

| | | | |
|---|---|---|---|
| 4,232,940 | 11/1980 | Nakagawa | 359/658 |
| 4,505,553 | 3/1985 | Asoma | 359/658 |
| 4,537,472 | 8/1985 | Asoma | 359/658 |
| 4,591,243 | 5/1986 | Yamagishi | 359/658 |
| 5,444,573 | 8/1995 | Saito | 359/659 |

FOREIGN PATENT DOCUMENTS

| | | |
|---|---|---|
| 57-148717 | 9/1982 | Japan . |
| 59-100409 | 6/1984 | Japan . |
| 60-260016 | 12/1985 | Japan . |
| 3-058089 | 9/1991 | Japan . |
| 3-058492 | 9/1991 | Japan . |
| 4-026448 | 5/1992 | Japan . |
| 4-220615 | 8/1992 | Japan . |

*Primary Examiner*—Scott J. Sugarman
*Attorney, Agent, or Firm*—Cushman, Darby & Cushman IP Group of Pillsbury, Madison & Sutro LLP

[57] ABSTRACT

A microscope objective lens system comprising a first lens unit which comprises a positive meniscus lens component having a concave surface on the object side and has a positive refractive power, a second lens unit which comprises a diverging cemented surface and has a positive refractive power, a third lens unit which comprises surfaces having strongly diverging functions and has a negative refractive power, and a fourth lens unit which has a negative refractive power; and configured so as to allow the second lens unit to be moved relatively to the first lens unit and the third lens unit in conjunction with thickness of a transparent plane parallel plate disposed between a surface of an object to be observed and the first lens unit, thereby correcting variations of aberrations caused due to changes in thickness of plane parallel plates.

17 Claims, 2 Drawing Sheets

MICROSCOPE OBJECTIVE LENS SYSTEM WITH CORRECTION RING

BACKGROUND OF THE INVENTION a) Field of the Invention

The present invention relates to a microscope objective lens system, and more specifically a microscope objective lens system with correction ring which is configured so as to be capable of maintaining favorable imaging performance thereof regardless of changes in thickness of plane parallel plates which are to be disposed on the object side of the objective lens system.

b) Description of the Prior Art

A microscope objective lens system is generally designed on a premise that it is to be used with plane parallel plates such as cover glass plates which have constant thickness. Accordingly, the objective lens system has imaging performance which is apt to be degraded when the lens system is used with a cover glass plate having thickness largely varied from a thickness value which is adopted as a design standard for the lens system. Such degradation of imaging performance is more remarkable as the objective lens system has a larger numerical aperture (N.A.). As objective lens systems which can correct variations of aberrations, there are conventionally known so-called objective lens systems with correction rings which are configured so as to be capable of correcting the variations of aberrations by varying airspaces reserved in the lens systems in conjunction with changes in thickness of cover glass plates.

An objective lens system disclosed by Japanese Patent Kokoku Publication No. Hei 3-58,089 is a conventional example of the objective lens systems with correction rings. This objective lens system consists, in order from the object side, of a first lens unit which is composed of a positive cemented meniscus lens component having a concave surface on the object side, a second lens unit which is composed of a positive lens element or a positive cemented lens component, and a third lens unit which has a positive refractive power as a whole; and is configured so as to allow the second lens unit to be moved along an optical axis for correcting the variations of aberrations caused due to changes in thickness of cover glass plates.

Next, a conventional objective lens system proposed by Japanese Patent Kokoku Publication No. Hei 4-26,448 consists, in order from the object side, of a first lens unit which comprises a positive meniscus lens component having a concave surface on the object side, a second lens unit having a positive refractive power, a third lens unit which comprises a cemented surface and has a negative refractive power as a whole, and a fourth lens unit having a negative refractive power; and is configured so as to allow the third lens unit to be moved along an optical axis for correcting the variations of aberrations caused due to the changes in thickness of cover glass plates.

Further, an objective lens system disclosed by Japanese Patent Kokai Publication No. Hei 4-220,615 consists, in order from the side opposite to the object side, i.e., in order from the image side toward the object side, of a first lens unit which is composed of a cemented lens component consisting of a negative lens element and a positive lens element, and has a negative refractive power as a whole; a second lens unit which is composed of a negative cemented meniscus lens component consisting of a negative lens element and a positive lens element, and having a convex surface on the object side; a third lens unit which comprises a positive lens component having an object side surface with a curvature which is higher greater than that of an image side surface thereof; and a fourth lens unit which has a positive refractive power as a whole, and comprises a plurality of negative lens elements, a plurality of positive lens elements and a positive lens component which is disposed at a location nearest an object to be observed and has a concave surface on the object side. This objective lens system is configured so as to allow the second lens unit and the third lens unit to be moved along an optical axis for correcting the variations of aberrations caused due to the changes in thickness of cover glass plates.

Moreover, a conventional objective lens system proposed by Japanese Patent Kokoku Publication No. Hei 3-58,492 consists, in order from the object side, of a first lens unit which has a positive refractive power and a function to convert a light bundle coming from an object to be observed into a converging light bundle, a second lens unit which is movable along an optical axis within the converging light bundle and a third lens unit which has a negative refractive power; and is configured so as to allow the second lens unit to be moved along the optical axis for correcting the variations of aberrations caused due to the changes in thickness of cover glass plates.

In recent days, the primary objectives of biological research have been shifting to studying mechanisms for transmitting information among cells from the conventional objectives of observing the forms of the cells themselves. Along with this shift came increased demands for microscopes and objective lens systems which have higher optical performance. When an inverted microscope is to be used for observing cells being cultivated in culture dishes which are made of plastic and glass materials and largely variable in thickness thereof, for example, it is strongly desired to select a microscope which has a magnification on the order of 60× suited for sizes of the cells as well as high resolving power and high contrast.

However, each of the objective lens systems disclosed by Japanese Patents Kokoku Publication No. Hei 3-58,089 and Publication No. Hei 4-26,448 has a magnification on the order of 40× and a numerical aperture on the order of 0.55, and is therefore insufficient from view-points of both magnification and resolving power. Further, each of these objective lens systems provides a visual field having a diameter only of 18 mm (or has a field number of 18).

The objective lens system proposed by Japanese Patent Kokai Publication No. Hei 4-220,615 has a small numerical aperture of 0.5 and, due to the fact that the two lens units thereof are moved independently along the optical axis, this objective lens system adopts a lens barrel frame which is remarkably complicated in structure thereby requiring a high manufacturing cost.

Further, the conventional objective lens system proposed by Japanese Patent Kokoku Publication No. Hei 3-58,492 has a magnification of 60× and a numerical aperture of 0.7. This objective lens system is configured so as to correct variations of spherical aberration caused due to changes in thickness of cover glass plates by producing negative spherical aberration with the first lens unit which converts the light bundle coming from the object into a converging light bundle and moving, along the optical axis, the second lens unit which produces positive spherical aberration. Due to the fact that the first lens unit produces a large amount of negative spherical aberration however, this conventional objective lens system allows other aberrations, such as chromatic aberration and coma in particular, to be produced in amounts too large for correction by moving the second lens unit, whereby the objective lens system allows chromatic aberration and coma to remain over the entire correction range and in the vicinity of a border of the correction range, respectively, of the variations of aberrations caused due to the changes in thickness of cover glass plates. In addition, this conventional objective lens system also has a field number of 18.

SUMMARY OF THE INVENTION

A primary object of the present invention is to provide a microscope objective lens system with a correction ring which has a magnification on the order of 60× and a large numerical aperture of 0.7; favorably corrects aberrations such as spherical aberration, chromatic aberration and coma over a relatively broad visual field; and is capable of maintaining excellent imaging performance thereof even when thickness of cover glass plates is largely varied from a predetermined standard thickness value.

The microscope objective lens system according to the present invention consists, in order from the object side, of a first lens unit which comprises a positive meniscus lens component having a concave surface on the object side, a second lens unit which comprises a cemented surface having a diverging function and has a positive refractive power as a whole, a third lens unit which comprises surfaces having negative refractive powers for obtaining a strongly diverging function, and a fourth lens unit which has a negative refractive power: the first lens unit having a function to convert a light bundle coming from an object to be observed into a nearly parallel light bundle. The objective lens system according to the present invention is characterized in that it allows the second lens unit to be moved relatively to the first lens unit and the third lens unit in conjunction with thickness of a transparent plane parallel plate which is disposed between the first lens unit and a surface of the object.

Further, the microscope objective lens system having the composition described above according to the present invention is characterized also in that it satisfies the following conditions (1), (2) and (3):

$$2 < f_1/F < 3 \quad (1)$$

$$3 < f_2/f_1 < 6 \quad (2)$$

$$1 < |R_3/\Delta n|/F < 12 \quad (3)$$

wherein the reference symbol F represents a focal length of the objective lens system as a whole, the reference symbols $f_1$ and $f_2$ designate focal lengths of the first lens unit and the second lens unit respectively, the reference symbol $R_3$ denotes a radius of curvature on at least one of surfaces having the negative refractive powers which are used in the third lens unit and the reference symbol $\Delta n$ represents a difference between refractive indices of media which are disposed before and after the surface which has the radius of curvature $R_3$.

For correcting longitudinal chromatic aberration more favorably in the microscope objective lens system according to the present invention which has the composition described above, it is desirable to compose the second lens unit of a cemented lens component which comprises at least one positive lens element and at least one negative lens element, and configure the second lens unit so as to satisfy the following condition (4):

$$v_{2p} - v_{2n} > 25 \quad (4)$$

wherein the reference symbol $v_{2p}$ represents an Abbe's number of the at least one positive lens element used in the second lens unit and the reference symbol $v_{2n}$ designates an Abbe's number of the at least one negative lens element used in the second lens unit.

Further, it is desirable for the microscope objective lens system according to the present invention to compose the third lens unit of a cemented lens component which comprises at least one positive lens element and at least one negative lens element, and configure the third lens unit so as to satisfy the following conditions (5) and (6):

$$n_{3n} - n_{3p} > 0.1 \quad (5)$$

$$v_{3p} - v_{3n} > 25 \quad (6)$$

wherein the reference symbol $n_{3p}$ represents a refractive index of the at least one positive lens element used in the third lens unit, the reference symbol $n_{3n}$ designates a refractive index of the at least one negative lens element used in the third lens unit, the reference symbol $v_{3p}$ denotes an Abbe's number of the at least one positive lens element used in the third lens unit and the reference symbol $v_{3n}$ represents an Abbe's number of the at least one negative lens element used in the third lens unit.

Furthermore it is desirable to compose the fourth lens unit of a front subunit which comprises a meniscus lens component having a convex surface on the object side and a rear subunit which comprises a meniscus lens component having a concave surface on the object side; and configure the fourth lens unit so as to satisfy the following conditions (7) and (8):

$$D_4/R_{4f} > 1.2 \quad (7)$$

$$v_{4B} < 50 \quad (8)$$

wherein the reference symbol $D_{4f}$ represents thickness of a central portion of the meniscus lens component having the convex surface on the object side, the reference symbol $R_{4f}$ designates a radius of curvature on an object side surface of the fourth lens unit and the reference symbol $v_{4B}$ denotes a mean value of Abbe's numbers of lens elements used for composing the meniscus lens component having the concave surface on the object side which is used in the fourth lens unit.

DETAILED DESCRIPTION OF THE PREFERRED EMBODIMENTS

Figure 1:
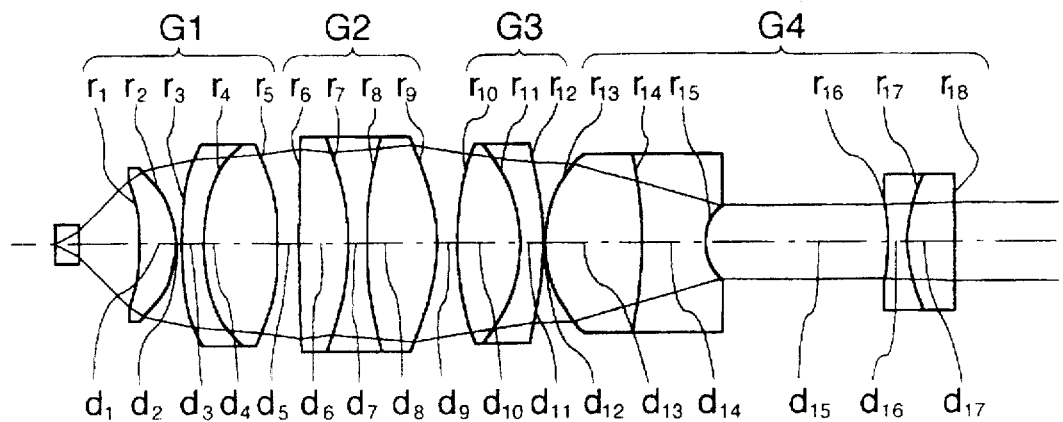
FIG. 1 shows a sectional view illustrating a composition of a first embodiment of the microscope objective lens system according to the present invention.

The microscope objective lens system according to the present invention consists, in order from the object side, of a first lens unit which comprises a positive meniscus lens component having a concave surface on the object side and has a positive refractive power for converting a light bundle coming from an object to be observed into a nearly parallel light bundle, a second lens unit which comprises a diverging cemented surface, has a positive refractive power as a whole and is movable along an optical axis, a third lens unit which comprises surfaces having negative refractive powers for obtaining strong diverging functions and a fourth lens unit which has a negative refractive power; and is characterized in that it allows the second lens unit to be moved relatively to the first lens unit and the third lens unit in conjunction with thickness of a transparent plane parallel plate which is disposed between the first lens unit and a surface of the object to be observed.

It is desirable to configure the objective lens system according to the present invention so as to satisfy the following conditions (1), (2) and (3):

$$2 < f_1/F < 3 \quad (1)$$

$$3 < f_2/f_1 < 6 \quad (2)$$

$$1 < |R_3/\Delta n|/F < 12 \quad (3)$$

wherein the reference symbol F represents a focal length of the objective lens system as a whole, the reference symbol $f_1$ designates a focal length of the first lens unit, the reference symbol $f_2$ denotes a focal length of the second lens unit, the reference symbol $R_3$ denotes a radius of curvature on at least one of the surfaces having the negative refractive powers, and the reference symbol $\Delta n$ represents a difference between refractive indices of media which are disposed before and after the surface having the radius of curvature $R_3$.

Further, it is desirable to compose the second lens unit of a cemented lens component which comprises a positive lens element and a negative lens element.

In the microscope objective lens system according to the present invention, the first lens unit which has the positive refractive power converts the light bundle coming from the object to be observed into a nearly parallel light bundle and undercorrects spherical aberration, longitudinal chromatic aberration and curvature of field. The second lens unit, which has the positive refractive power, converts the nearly parallel light bundle which has emerged from the first lens unit into a converging light bundle and further undercorrects spherical aberration. Longitudinal chromatic aberration is slightly overcorrected by the diverging cemented surface used in the second lens unit. The third lens unit produces positive spherical aberration in a large amount by the surfaces which have the negative refractive powers for obtaining the strongly diverging functions and has a role to overcorrect longitudinal chromatic aberration. The fourth lens unit, which has the negative refractive power, has a role to undercorrect curvature of field and lateral chromatic aberration at the same time. Owing to the functions of the first through fourth lens units described above, the objective lens system according to the present invention has favorable imaging performance as a whole.

Now, description will be made of a remarkable characteristic of the microscope objective lens system according to the present invention that it is capable of correcting, by moving the second lens unit along the optical axis, variations of spherical aberration which are caused due to changes in thickness of cover glass plates. A microscope objective lens system generally uses, at a location nearest an object to be observed, a lens unit having a positive refractive power which converts a diverging light bundle coming from the object to be observed into a converging light bundle to be led toward the image side. Accordingly, the lens unit disposed on the object side, i.e., the first lens unit in case of the objective lens system according to the present invention, ordinarily has a focal length shorter than that of any one of other lens units used in the lens system. As a result, this lens unit remarkably undercorrects or overcorrects aberrations. One of the important points for lens design therefore lies in how favorably these remarkable aberrations are to be corrected by lens units which are subsequent to the lens unit disposed on the object side. For a microscope objective lens system with correction ring which corrects aberrations by moving a lens unit, like that according to the present invention in particular, it is necessary to take other points into consideration in addition to the basic point for correction of aberrations in the microscope objective lens system described above.

The microscope objective lens system with correction ring according to the present invention is configured on a design basis for minimizing aberrations to be produced by the movable lens unit, variations of aberrations to be caused by moving the lens unit and aberrations to be produced by the stationary lens units. Speaking concretely, a positive refractive power just sufficient to convert the diverging light bundle coming from the object to be observed into the nearly parallel light bundle is imparted to the first lens unit which is apt to produce remarkable aberrations so that this lens unit produces aberrations, chromatic aberration and coma in particular, in amounts as small as possible. Further, variations of aberrations which are produced by the first lens unit can be made very slight since heights of rays incident on the first lens unit can be made substantially unchanged by changing a working distance of the objective lens system for a distance corresponding to an optical path length of a difference in thickness between cover glass plates.

As a means for correcting aberrations in the microscope objective lens system with correction ring or minimizing aberrations to be produced by the first lens unit, it is conceivable to configure this lens unit so that it will allow a diverging light bundle to emerge therefrom. Due to a fact that a large number of lens elements cannot be disposed within a limited range of a total length or so-called perfocality length of the objective lens system, however, such a concept will make it necessary that the lens units subsequent to the first lens unit have converging functions stronger than required, thereby causing these lens units to produce aberrations of high orders and unbalancing aberrations with one another in the objective lens system as a whole. If an attempt is made to correct aberrations forcibly by such a means, heights of rays will be lowered on the lens units, thereby shortening a working distance of the objective lens system. Therefore, the means described above is not suited for correcting aberrations in the microscope objective lens system with correction ring.

The second lens unit, which converts the nearly parallel light bundle having emerged from the first lens unit into the converging light bundle so that a light bundle emerging from the objective lens system will have a predetermined diameter, does not require so strong a refractive power since a sufficient distance is reserved between the second lens unit and a final surface of the objective lens system. Accordingly, the second lens unit can easily be configured so as to produce negative spherical aberration and chromatic aberration in amounts not so large. Since the working distance is changed for the distance corresponding to the difference in thickness between the cover glass plates as described above, heights of rays emerging from the first lens unit are substantially unchanged due to the changes in thickness of the cover glass plates and since the light bundle having emerged from the first lens unit is maintained in the nearly parallel condition, negative spherical aberration produced by the second lens unit is varied little. Accordingly, the variations of spherical aberration caused due to the changes in thickness of the cover glass plates gives substantially no influences on spherical aberration produced by the first lens unit and the second lens unit, whereby these aberrations remain unchanged after the light bundle has emerged from the second lens unit.

It is therefore necessary to cancel the variations of spherical aberration by varying an amount of positive spherical aberration to be produced by the third lens unit. When a cover glass plate has thickness smaller than a predetermined standard value and produces positive spherical aberration in a small amount, for example, the second lens unit is moved toward the third lens unit so as to enhance incident rays on the third lens unit, thereby allowing the third lens unit to produce positive spherical aberration in a large amount so as to cancel a variation of spherical aberration in the objective lens system as a whole. When a cover glass plate has thickness larger than the predetermined standard value and produces positive spherical aberration in a large amount, in contrast, the second lens unit is moved toward the first lens unit so as to lower the incident rays on the third lens unit, thereby allowing the third lens unit to produce positive spherical aberration in a small amount so as to cancel a variation of spherical aberration in the objective lens system as a whole.

Since each of the lens units, the first lens unit in particular, is configured so as to produce spherical aberration, chromatic aberration and coma in minimum amounts, and since heights of the incident rays and the emerging rays are substantially unchanged on the first lens unit regardless of the changes in thickness of the cover glass plates as described above, spherical aberration, chromatic aberration and coma are varied very slightly in the objective lens system according to the present invention. By moving the second lens unit along the optical axis for cancelling the variation of spherical aberration caused due to the changes in thickness of the cover glass plates, it is possible to simultaneously cancel the variations of chromatic aberration and coma, thereby correcting aberrations favorably over a relatively broad visual field ranging from a center thereof to a field number of 22.

For obtaining the functions of the lens units to correct aberrations which have been described above, it is desirable to configure the first through third lens units of the objective lens system according to the present invention so as to satisfy the following conditions (1), (2) and (3):

$$2 < f_1/F < 3 \quad (1)$$

$$3 < f_2/f_1 < 6 \quad (2)$$

$$1 < |R_3/\Delta n|/F < 12 \quad (3)$$

wherein the reference symbol F represents a focal length of the objective lens system as a whole, the reference symbol $f_1$ designates a focal length of the first lens unit, the reference symbol $f_2$ denotes a focal length of the second lens unit, the reference symbol $R_3$ represents a radius of curvature on at least one of surfaces which have negative refractive powers in the third lens unit, and the reference symbol $\Delta n$ designates a difference between refractive indices of the media disposed before and after the surface which has the radius of curvature $R_3$.

The condition (1) which defines a refractive power of the first lens unit is required for correcting spherical aberration, coma and chromatic aberration. If the lower limit of 2 of the condition (1) is exceeded, the first lens unit will have too strong a refractive power, whereby spherical aberration, coma and chromatic aberration as well as spherical aberration produced in the short wavelength region will be undercorrected too remarkably for correction with the lens units which are subsequent to the first lens unit. If the upper limit of 3 of the condition (1) is exceeded, in contrast, the first lens unit will have too weak a refractive power and allow rays having large heights to emerge therefrom, thereby allowing spherical aberration of high orders to be produced. Further, it will be difficult to limit a total length of the objective lens system within a perfocality length thereof. If the upper limit of the condition (1) or the lower limit of this condition is exceeded, it will be difficult to maintain a light bundle emerging from the first lens unit in a nearly parallel condition while reserving a sufficient working distance of the objective lens system, thereby disabling the lens system from effectively cancelling, by moving the second lens unit, the variations of spherical aberration caused due to the changes in thickness of the cover glass plates.

The condition (2) which defines a ratio between a refractive power of the first lens unit and that of the second lens unit is required for cancelling, by moving the second lens unit, the variations of spherical aberration caused due to the changes in thickness of the cover glass plates. If the lower limit of 3 or the upper limit of 6 of the condition (2) is exceeded, the second lens unit will have a refractive power which is too strong relative to that of the first lens unit or the first lens unit will have a refractive power which is too strong relative to that of the second lens unit, whereby negative spherical aberration is produced mainly by either of the first lens unit or the second lens unit and chromatic aberration and coma will remain though only the variations of spherical aberration caused due to the changes in thickness of the cover glass plates can be cancelled by moving the second lens unit.

The condition (3) which defines a diversing power of the at least one of the surfaces having the negative refractive powers in the third lens unit is required for cancelling negative spherical aberration produced by the first lens unit and the second lens unit with positive spherical aberration which is to be produced by the surface having the negative refractive power. If the lower limit of 1 of the condition (3) is exceeded, the surface having the negative refractive power will have high curvature, thereby aggravating positive spherical aberration and producing spherical aberration of high orders which are to remain even when the second lens unit is moved for cancelling the variations of spherical aberration caused due to the changes in thickness of the cover glass plates. If the upper limit of 12 of the condition (3) is exceeded, in contrast, the surface having the negative refractive power will produce positive spherical aberration in a small amount and undercorrect longitudinal chromatic aberration, whereby negative spherical aberration and longitudinal chromatic aberration will remain even when the second lens unit is moved for cancelling the variations of spherical aberration caused due to the changes in thickness of the cover glass plates.

For correcting longitudinal chromatic aberration more favorably, it is desirable to configure the second lens unit so as to comprise a cemented lens component which comprises at least one positive lens element and at least one negative lens element, and satisfy the following condition (4):

$$v_{2p} - v_{2n} > 25 \quad (4)$$

wherein the reference symbol $v_{2p}$ represents an Abbe's number of the at least one positive lens element used in the second lens unit and the reference symbol $v_{2n}$ designates an Abbe's number of the at least one negative lens element used in the second lens unit.

If the lower limit of 25 of the condition (4) is exceeded, remarkably undercorrected longitudinal chromatic aberration will remain and too heavy a burden for correcting longitudinal chromatic aberration will be imposed on the surface having the negative refractive power which is used in the third lens unit, whereby aberrations of high orders will be produced and unbalance aberrations with one another in the objective lens system as a whole.

For balancing the function for overcorrecting positive spherical aberration produced by the diverging power of the surface having the negative refractive power which is used in the third lens unit with the function for overcorrecting longitudinal chromatic aberration, it is desirable to configure the third lens unit so as to comprise a cemented lens component which comprises at least one positive lens element and at least one negative lens element, and satisfy the following conditions (5) and (6):

$$n_{3n} - n_{3p} > 0.1 \quad (5)$$

$$v_{3p} - v_{3n} > 25 \quad (6)$$

wherein the reference symbol $n_{3p}$ represents a refractive power of the at least one positive lens element comprised in the cemented lens component used in the third lens unit, the reference symbol $n_{3n}$ designates a refractive index of the at least one negative lens element comprised in the cemented lens component used in the third lens unit, the reference symbol $v_{3p}$ denotes an Abbe's number of the at least one positive lens element comprised in the cemented lens component used in the third lens unit and the reference symbol $v_{3n}$ represents an Abbe's number of the at least one negative lens element comprised in the cemented lens component used in the third lens unit.

If the lower limit of 0.1 of the condition (5) is exceeded, the cemented surface must have higher curvature for producing positive spherical aberration and the other surfaces having the negative refractive powers will have higher curvature, thereby producing spherical aberration of high orders which cannot be corrected by the subsequent fourth lens unit only. If the lower limit of 25 of the condition (6) is exceeded, it will be difficult to correct longitudinal chromatic aberration, or an attempt to correct longitudinal chromatic aberration will enhance curvature on the cemented surface, thereby producing spherical aberration of high orders as described above.

For correcting curvature of field and lateral chromatic aberration more favorably, it is desirable to compose the fourth lens unit having the negative refractive power of a front subunit which consists of a meniscus lens component having a convex surface on the object side and a rear subunit which consists of a meniscus lens component having a concave surface on the object side so that the front subunit and the rear subunit will correct curvature of field and lateral chromatic aberration respectively and independently. Further, it is desirable to configure the fourth lens unit so as to satisfy the following conditions (7) and (8):

$$D_4/R_{4f} > 1.2 \quad (7)$$

$$v_{4B} < 50 \quad (8)$$

wherein the reference symbol $D_{4f}$ represents thickness of a central portion of the meniscus lens component having the convex surface on the object side, the reference symbol $R_{4f}$ designates a radius of curvature on an object side convex surface of the fourth lens unit, and the reference symbol $v_{4B}$ denotes a mean value of Abbe's numbers of lens elements which are used for composing the meniscus lens component having the concave surface on the object side and used in the fourth lens unit.

If the lower limit of 1.2 of the condition (7) is exceeded, the meniscus lens component having the convex surface on the object side and used in the fourth lens unit will have a central portion which is too thin to reduce a diameter of a light bundle, whereby curvature of field will be undercorrected in the objective lens system as a whole. If the upper limit of 50 of the condition (8) is exceeded, overcorrected lateral chromatic aberration will remain. An attempt to forcibly correct lateral chromatic aberration will allow longitudinal chromatic aberration to be produced, thereby unbalancing correction of chromatic aberration in the objective lens system as a whole.

Now, description will be made consectively of first through seventh embodiment of the microscope objective lens system with correction ring according to the present invention:

Each of the first, third and fifth embodiment of the microscope objective lens system according to the present invention has a composition illustrated in FIG. 1, wherein a first lens unit $G_1$ is composed of a positive meniscus lens component having a concave surface on the object side, and a cemented lens component which consists of a negative meniscus lens element having a convex surface on the object side and a biconvex lens element, a second lens unit $G_2$ is composed of a cemented triplet which consists of a biconvex lens element, a biconcave lens element and a biconvex lens element, a third lens unit $G_3$ is composed of a cemented lens component which consists of a biconvex lens element and a negative meniscus lens element having a concave surface on the object side, and a fourth lens unit $G_4$ is composed of a front subunit which consists of a cemented lens component composed of a biconvex lens element and a biconcave lens element, and a rear subunit which consists of a cemented meniscus lens component composed of a biconcave lens element and a biconvex lens element.

Figure 2:
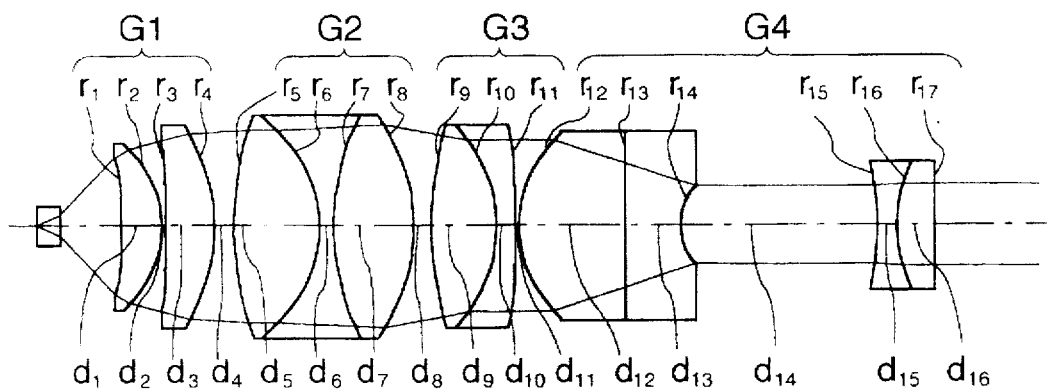
FIG. 2 shows a sectional view illustrating a composition of a second embodiment of the microscope objective lens system according to the present invention.

The second embodiment of the present invention has a composition illustrated in FIG. 2, wherein a first lens unit $G_1$ is composed of a positive meniscus lens component having a concave surface on the object side and a positive meniscus lens component having a concave surface on the object side, a second lens unit $G_2$ is composed of a cemented triplet which consists of a biconvex lens element, a biconcave lens element and a biconvex lens element, a third lens unit $G_3$ is composed of a cemented lens component which consists of a biconvex lens element and a negative meniscus lens element having a concave surface on the object side, and a fourth lens unit $G_4$ is composed of a front subunit which is composed of a cemented meniscus lens component consisting of a convexo-planar lens element and plano-concave lens element, and a rear subunit which is composed of a cemented meniscus lens component consisting of a biconcave lens element and a biconvex lens element.

Figure 3:
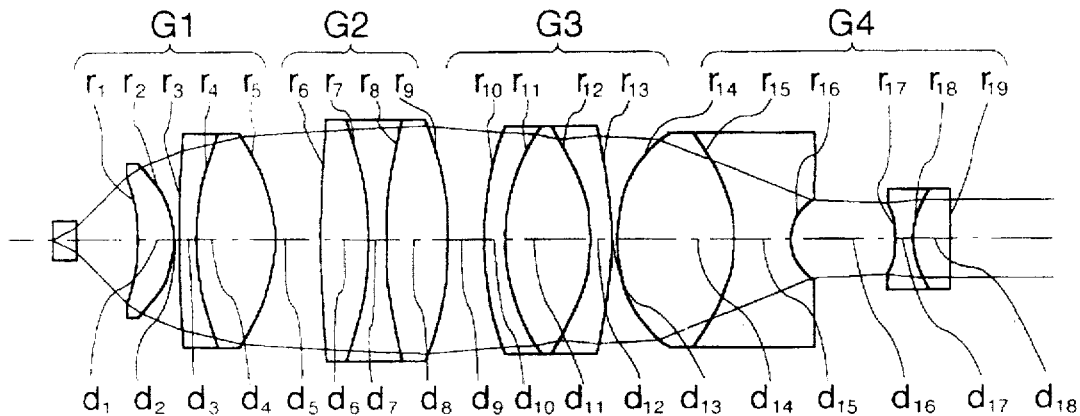
FIG. 3 shows a sectional view illustrating a composition of a fourth embodiment of the microscope objective lens system according to the present invention.

In the fourth embodiment of the present invention which has a composition illustrated in FIG. 3, a first lens unit $G_1$ is composed of a cemented lens component which consists of a negative meniscus lens element having a convex surface on the object side and a biconvex lens element, a second lens unit $G_2$ is composed of a cemented triplet which consists of a biconvex lens element, a biconcave lens element and a biconvex lens element, a third lens unit $G_3$ is composed of a cemented triplet which consists of a negative meniscus lens element having a convex surface on the object side, a biconvex lens element and a negative meniscus lens element having a concave surface on the object side, and a fourth lens unit $G_4$ is composed of a front subunit which is composed of a cemented meniscus lens component consisting of a biconvex lens element and a biconcave lens element, and a rear subunit which is composed of a cemented meniscus component consisting of a biconcave lens element and a biconvex lens element.

Figure 4:
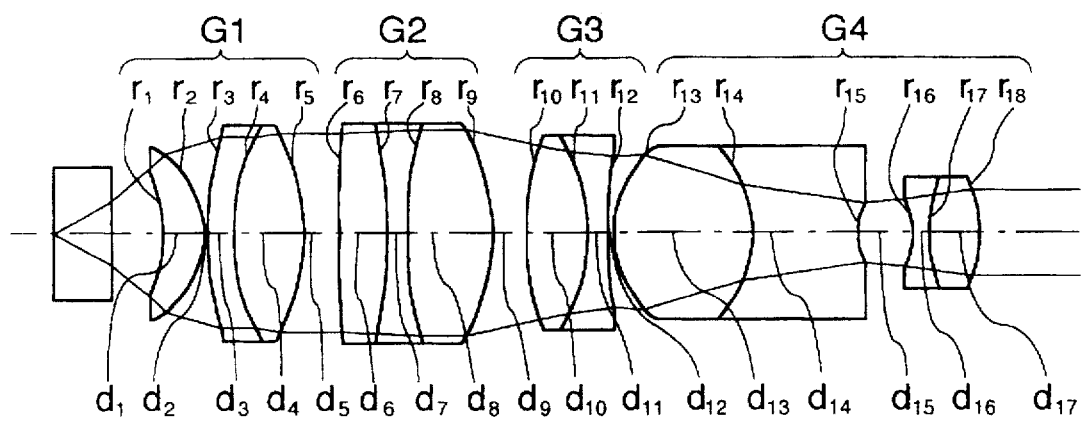
FIG. 4 shows a sectional view illustrating a composition of a sixth embodiment of the microscope objective lens system according to the present invention.

In the sixth embodiment of the present invention which has a composition illustrated in FIG. 4, a first lens unit $G_1$ is composed of a positive meniscus lens component, and a cemented lens component which consists of a negative meniscus lens element having a convex surface on the object side and a biconvex lens element, a second lens unit $G_2$ is composed of a cemented triplet which consists of a biconvex lens element, a biconcave lens element and a biconvex lens element, a third lens unit $G_3$ is composed of a cemented lens component which consists of a biconvex lens element and a biconcave lens element, and a fourth lens unit $G_4$ is composed of a front subunit which is composed of a cemented meniscus lens component consisting of a biconvex lens element and a biconcave lens element, and a rear subunit which is composed of a cemented lens component consisting of a biconcave lens element and a biconvex lens element.

Figure 5:
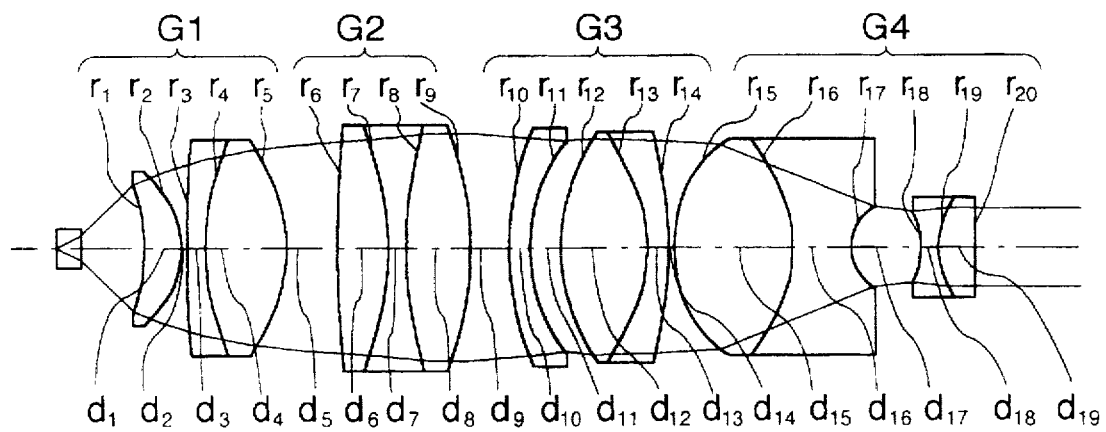
FIG. 5 shows a sectional view illustrating a composition of a seventh embodiment of the microscope objective lens system according to the present invention.

The seventh embodiment of the present invention has a composition illustrated in FIG. 5, wherein a first lens unit $G_1$ is composed of a positive meniscus lens component having a concave surface on the object side, and a cemented lens component which consists of a negative meniscus lens element having a convex surface on the object side and a biconvex lens element, a second lens unit $G_2$ is composed of a cemented triplet which consists of a biconvex lens element, a biconcave lens element and a biconvex lens element, a third lens unit $G_3$ is composed of a negative meniscus lens component consisting of a single lens element having a convex surface on the object side, and a negative cemented meniscus lens component which consists of a biconvex lens element and a negative meniscus lens element having a concave surface on the object side, and a fourth lens unit $G_4$ is composed of a front subunit which is composed of a cemented lens component consisting of a biconvex lens element and a biconcave lens element, and a rear subunit which is composed of a cemented lens component consisting of a biconcave lens element and a biconvex lens element.

The embodiments described above of the present invention have the following numerical data:

---

Embodiment 1

$F = 3, \beta = 60, N.A. = 0.7, W.D. = 3.28$ $r_1 = -9.6578$
  $d_1 = 2.0003$   $n_{d1} = 1.88300$   $v_{d1} = 40.78$
$r_2 = -5.1212$
  $d_2 = 0.2000$
$r_3 = 13.5846$
  $d_3 = 1.2500$   $n_{d2} = 1.61340$   $v_{d2} = 43.84$
$r_4 = 8.1323$
  $d_4 = 4.0000$   $n_{d3} = 1.43875$   $v_{d3} = 94.97$
$r_5 = -14.3368$
  $d_5 = 1.1533$
$r_6 = 89.8012$
  $d_6 = 2.7000$   $n_{d4} = 1.43875$   $v_{d4} = 94.97$
$r_7 = -14.6341$
  $d_7 = 1.0000$   $n_{d5} = 1.61340$   $v_{d5} = 43.84$
$r_8 = 23.2012$
  $d_8 = 3.8000$   $n_{d6} = 1.49700$   $v_{d6} = 81.61$

---

-continued

Embodiment 1

$r_9 = -11.1740$
  $d_9 = 1.0123$
$r_{10} = 13.8482$
  $d_{10} = 3.5000$   $n_{d7} = 1.43875$   $v_{d7} = 94.97$
$r_{11} = -8.3788$
  $d_{11} = 1.1000$   $n_{d8} = 1.88300$   $v_{d8} = 40.78$
$r_{12} = -90.3554$
  $d_{12} = 0.2000$
$r_{13} = 6.0907$
  $d_{13} = 5.2829$   $n_{d9} = 1.49700$   $v_{d9} = 81.61$
$r_{14} = -26.0741$
  $d_{14} = 3.5246$   $n_{d10} = 1.64450$   $v_{d10} = 40.82$
$r_{15} = 2.9872$
  $d_{15} = 9.7709$
$r_{16} = -11.5949$
  $d_{16} = 0.9000$   $n_{d11} = 1.71850$   $v_{d11} = 33.52$
$r_{17} = 7.4340$
  $d_{17} = 2.5000$   $n_{d12} = 1.84666$   $v_{d12} = 23.78$
$r_{18} = -20.7236$

| thickness of cover glass plate (mm) | 0.7 | 1.2 | 1.7 |
|---|---|---|---|
| W.D. | 3.621 | 3.28 | 2.938 |
| $d_5$ | 1.966 | 1.153 | 0.2 |
| $d_9$ | 0.2 | 1.012 | 1.965 |

(1) $f_1/F = 2.31$
(2) $f_2/f_1 = 4.29$
(3) $|R_3|/\Delta n|F = 6.29$
(4) $v_{2p} - v_{2n} = 37.77$
(5) $n_{3n} - n_{3p} = 0.444$
(6) $v_{3p} - v_{3n} = 54.19$
(7) $D_{4f}/R_{4f} = 1.45$
(8) $v_{4B} = 28.65$

---

Embodiment 2

$F = 3, \beta = 60, N.A. = 0.7, W.D. = 3.559$ $r_1 = -12.7415$
  $d_1 = 2.0000$   $n_{d1} = 1.88300$   $v_{d1} = 40.78$
$r_2 = -5.9568$
  $d_2 = 0.1016$
$r_3 = -61.9075$
  $d_3 = 2.8000$   $n_{d2} = 1.49700$   $v_{d2} = 81.61$
$r_4 = -9.1673$
  $d_4 = 0.9481$
$r_5 = 19.2425$
  $d_5 = 4.5000$   $n_{d3} = 1.43875$   $v_{d3} = 94.97$
$r_6 = -7.2265$
  $d_6 = 0.8000$   $n_{d4} = 1.57041$   $v_{d4} = 48.13$
$r_7 = 12.8924$
  $d_7 = 4.5000$   $n_{d5} = 1.43875$   $v_{d5} = 94.97$
$r_8 = -9.5328$
  $d_8 = 0.8385$
$r_9 = 19.1216$
  $d_9 = 3.5000$   $n_{d6} = 1.43875$   $v_{d6} = 94.97$
$r_{10} = -8.2659$
  $d_{10} = 1.0400$   $n_{d7} = 1.88300$   $v_{d7} = 40.78$
$r_{11} = -50.7371$
  $d_{11} = 0.2000$
$r_{12} = 6.4644$
  $d_{12} = 5.6637$   $n_{d8} = 1.49700$   $v_{d8} = 81.61$
$r_{13} = \infty$
  $d_{13} = 3.1816$   $n_{d9} = 1.61340$   $v_{d9} = 43.84$
$r_{14} = 3.1560$
  $d_{14} = 10.5670$
$r_{15} = -16.3696$
  $d_{15} = 0.9000$   $n_{d10} = 1.67650$   $v_{d10} = 37.54$
$r_{16} = 7.7796$
  $d_{16} = 2.0000$   $n_{d11} = 1.84666$   $v_{d11} = 23.78$
$r_{17} = -55.8895$ 5,739,958

Embodiment 2 -continued

| thickness of cover glass plate (mm) | 0.7 | 1.2 | 1.7 |
|---|---|---|---|
| W.D. | 3.894 | 3.559 | 3.223 |
| $d_4$ | 1.636 | 0.948 | 0.15 |
| $d_8$ | 0.151 | 0.839 | 1.637 |

(1) $f_1/F = 2.55$
(2) $f_2/f_1 = 3.31$
(3) $|R_3/\Delta n|/F = 6.2$
(4) $\nu_{2p} - \nu_{2n} = 46.84$
(5) $n_{3n} - n_{3p} = 0.444$
(6) $\nu_{3p} - \nu_{3n} = 54.19$
(7) $D_{4f}/R_{4f} = 1.37$
(8) $\nu_{4B} = 30.66$

Embodiment 3

$F = 3, \beta = 60, N.A. = 0.7, W.D. = 3.28$

| | | |
|---|---|---|
| $r_1 = -11.0439$ | | |
| $d_1 = 2.0003$ | $n_{d1} = 1.88300$ | $\nu_{d1} = 40.78$ |
| $r_2 = -5.5914$ | | |
| $d_2 = 0.2000$ | | |
| $r_3 = 19.2358$ | | |
| $d_3 = 1.2500$ | $n_{d2} = 1.64450$ | $\nu_{d2} = 40.82$ |
| $r_4 = 10.0046$ | | |
| $d_4 = 4.0000$ | $n_{d3} = 1.43875$ | $\nu_{d3} = 94.97$ |
| $r_5 = -10.4821$ | | |
| $d_5 = 1.4499$ | | |
| $r_6 = 88.7979$ | | |
| $d_6 = 3.0000$ | $n_{d4} = 1.43875$ | $\nu_{d4} = 94.97$ |
| $r_7 = -11.8605$ | | |
| $d_7 = 1.0000$ | $n_{d5} = 1.52944$ | $\nu_{d5} = 51.72$ |
| $r_8 = 22.3672$ | | |
| $d_8 = 3.8000$ | $n_{d6} = 1.43875$ | $\nu_{d6} = 94.97$ |
| $r_9 = -11.3298$ | | |
| $d_9 = 1.1987$ | | |
| $r_{10} = 16.7912$ | | |
| $d_{10} = 3.5000$ | $n_{d7} = 1.43875$ | $\nu_{d7} = 94.97$ |
| $r_{11} = -8.8222$ | | |
| $d_{11} = 1.1000$ | $n_{d8} = 1.88300$ | $\nu_{d8} = 40.78$ |
| $r_{12} = -48.3711$ | | |
| $d_{12} = 0.2000$ | | |
| $r_{13} = 6.6151$ | | |
| $d_{13} = 5.3839$ | $n_{d9} = 1.49700$ | $\nu_{d9} = 81.61$ |
| $r_{14} = -55.2564$ | | |
| $d_{14} = 3.6439$ | $n_{d10} = 1.61340$ | $\nu_{d10} = 43.84$ |
| $r_{15} = 3.1662$ | | |
| $d_{15} = 8.7675$ | | |
| $r_{16} = -10.8858$ | | |
| $d_{16} = 0.9000$ | $n_{d11} = 1.74000$ | $\nu_{d11} = 31.71$ |
| $r_{17} = 6.2752$ | | |
| $d_{17} = 2.5000$ | $n_{d12} = 1.84666$ | $\nu_{d12} = 23.78$ |
| $r_{18} = -22.7825$ | | |

| thickness of cover glass plate (mm) | 0.6 | 1.2 | 1.8 |
|---|---|---|---|
| W.D. | 3.683 | 3.28 | 2.875 |
| $d_5$ | 2.449 | 1.45 | 0.2 |
| $d_9$ | 0.2 | 1.199 | 2.448 |

(1) $f_1/F = 2.46$
(2) $f_2/f_1 = 4.17$
(3) $|R_3/\Delta n|/F = 6.62$
(4) $\nu_{2p} - \nu_{2n} = 42.79$
(5) $n_{3n} - n_{3p} = 0.444$
(6) $\nu_{3p} - \nu_{3n} = 54.19$
(7) $D_{4f}/R_{4f} = 1.36$
(8) $\nu_{4B} = 27.75$

Embodiment 4

$F = 3, \beta = 60, N.A. = 0.7, W.D. = 3.28$

| | | |
|---|---|---|
| $r_1 = -11.7635$ | | |
| $d_1 = 2.0003$ | $n_{d1} = 1.78650$ | $\nu_{d1} = 50.00$ |
| $r_2 = -5.5705$ | | |
| $d_2 = 0.2000$ | | |
| $r_3 = 51.1040$ | | |
| $d_3 = 1.0000$ | $n_{d2} = 1.64450$ | $\nu_{d1} = 40.82$ |
| $r_4 = 15.3942$ | | |
| $d_4 = 4.5000$ | $n_{d3} = 1.43875$ | $\nu_{d3} = 94.97$ |
| $r_5 = -8.9120$ | | |
| $d_5 = 2.3509$ | | |
| $r_6 = 95.3605$ | | |
| $d_6 = 2.7000$ | $n_{d4} = 1.43875$ | $\nu_{d4} = 94.97$ |
| $r_7 = -19.7362$ | | |
| $d_7 = 1.0000$ | $n_{d5} = 1.61340$ | $\nu_{d5} = 43.84$ |
| $r_8 = 33.8588$ | | |
| $d_8 = 3.3000$ | $n_{d6} = 1.49700$ | $\nu_{d6} = 81.61$ |
| $r_9 = -17.0558$ | | |
| $d_9 = 1.9182$ | | |
| $r_{10} = 19.0855$ | | |
| $d_{10} = 1.1000$ | $n_{d7} = 1.61340$ | $\nu_{d7} = 43.84$ |
| $r_{11} = 10.7969$ | | |
| $d_{11} = 4.8000$ | $n_{d8} = 1.43875$ | $\nu_{d8} = 94.97$ |
| $r_{12} = -9.2156$ | | |
| $d_{12} = 1.0000$ | $n_{d9} = 1.78650$ | $\nu_{d9} = 50.00$ |
| $r_{13} = -25.0641$ | | |
| $d_{13} = 0.2000$ | | |
| $r_{14} = 7.0957$ | | |
| $d_{14} = 6.4566$ | $n_{d10} = 1.49700$ | $\nu_{d10} = 81.6.1$ |
| $r_{15} = -7.7479$ | | |
| $d_{15} = 3.1462$ | $n_{d11} = 1.50847$ | $\nu_{d11} = 60.83$ |
| $r_{16} = 3.0054$ | | |
| $d_{16} = 5.2221$ | | |
| $r_{17} = -9.5350$ | | |
| $d_{17} = 1.0000$ | $n_{d12} = 1.67650$ | $\nu_{d12} = 37.54$ |
| $r_{18} = 5.0231$ | | |
| $d_{18} = 2.0000$ | $n_{d13} = 1.80518$ | $\nu_{d13} = 25.43$ |
| $r_{19} = -64.1774$ | | |

| thickness of cover glass plate (mm) | 0.7 | 1.2 | 1.7 |
|---|---|---|---|
| W.D. | 3.561 | 3.28 | 3.004 |
| $d_5$ | 4.069 | 2.351 | 0.2 |
| $d_9$ | 0.2 | 1.918 | 4.069 |

(1) $f_1/F = 2.76$
(2) $f_2/f_1 = 5.53$
(3) $|R_3/\Delta n|/F = 8.83$
(4) $\nu_{2p} - \nu_{2n} = 37.77$
(5) $n_{3n} - n_{3p} = 0.175$
(6) $\nu_{3p} - \nu_{3n} = 44.97$
(7) $D_{4f}/R_{4f} = 1.35$
(8) $\nu_{4B} = 31.49$

Embodiment 5

$F = 3, \beta = 60, N.A. = 0.7, W.D. = 3.95$

| | | |
|---|---|---|
| $r_1 = -10.6324$ | | |
| $d_1 = 2.0003$ | $n_{d1} = 1.88300$ | $\nu_{d1} = 40.78$ |
| $r_2 = -5.7706$ | | |
| $d_2 = 0.2000$ | | |
| $r_3 = 24.5759$ | | |
| $d_3 = 1.2500$ | $n_{d2} = 1.64450$ | $\nu_{d2} = 40.82$ |
| $r_4 = 12.5729$ | | |
| $d_4 = 4.0000$ | $n_{d3} = 1.43875$ | $\nu_{d3} = 94.97$ |
| $r_5 = -11.4323$ | | |
| $d_5 = 1.9951$ | | |
| $r_6 = 89.6205$ | | |
| $d_6 = 2.5000$ | $n_{d4} = 1.43875$ | $\nu_{d4} = 94.97$ |
| $r_7 = -16.8675$ | | |
| $d_7 = 1.0000$ | $n_{d5} = 1.61340$ | $\nu_{d5} = 43.84$ |
| $r_8 = 16.4265$ | | |
| $d_8 = 4.5000$ | $n_{d6} = 1.43875$ | $\nu_{d6} = 94.97$ |

Embodiment 5 -continued $r_9 = -11.8392$
$d_9 = 1.6260$
$r_{10} = 29.5303$
$d_{10} = 3.5000$   $n_{d7} = 1.43875$   $v_{d7} = 94.97$
$r_{11} = -9.8799$
$d_{11} = 1.1000$   $n_{d8} = 1.88300$   $v_{d8} = 40.78$
$r_{12} = -28.4429$
$d_{12} = 0.2000$
$r_{13} = 8.3500$
$d_{13} = 7.0168$   $n_{d9} = 1.49700$   $v_{d9} = 81.61$
$r_{14} = -11.1787$
$d_{14} = 5.9355$   $n_{d10} = 1.52944$   $v_{d10} = 51.72$
$r_{15} = 3.0488$
$d_{15} = 3.0000$
$r_{16} = -8.4468$
$d_{16} = 0.9000$   $n_{d11} = 1.74000$   $v_{d11} = 31.71$
$r_{17} = 4.2614$
$d_{17} = 2.5000$   $n_{d12} = 1.84666$   $v_{d12} = 23.78$
$r_{18} = -23.7958$

| thickness of cover glass plate (mm) | 0.7 | 1.2 | 1.7 |
|---|---|---|---|
| W.D. | 4.281 | 3.95 | 3.62 |
| $d_5$ | 3.421 | 1.995 | 0.2 |
| $d_9$ | 0.2 | 1.626 | 3.421 |

(1) $f_1/F = 2.71$
(2) $f_2/f_1 = 5.41$
(3) $|R_3/\Delta n|/F = 7.41$
(4) $v_{2p} - v_{2n} = 51.13$
(5) $n_{3n} - n_{3p} = 0.444$
(6) $v_{3p} - v_{3n} = 54.19$
(7) $D_{4f}/R_{4f} = 1.55$
(8) $v_{4B} = 27.75$

Embodiment 6

$F = 3, \beta = 60, N.A. = 0.7, W.D. = 2.7$ $r_1 = -9.7625$
$d_1 = 2.0003$   $n_{d1} = 1.88300$   $v_{d1} = 40.78$
$r_2 = -5.3952$
$d_2 = 0.2000$
$r_3 = 19.4183$
$d_3 = 1.2500$   $n_{d2} = 1.64450$   $v_{d2} = 40.82$
$r_4 = 10.4219$
$d_4 = 4.0000$   $n_{d3} = 1.43875$   $v_{d3} = 94.97$
$r_5 = -10.5480$
$d_5 = 1.7794$
$r_6 = 91.1232$
$d_6 = 2.5000$   $n_{d4} = 1.43875$   $v_{d4} = 94.97$
$r_7 = -25.3541$
$d_7 = 1.0000$   $n_{d5} = 1.52944$   $v_{d5} = 51.72$
$r_8 = 19.7586$
$d_8 = 4.5000$   $n_{d6} = 1.43875$   $v_{d6} = 94.97$
$r_9 = -11.2549$
$d_9 = 1.5090$
$r_{10} = 11.9296$
$d_{10} = 3.5000$   $n_{d7} = 1.43875$   $v_{d7} = 94.97$
$r_{11} = -8.8854$
$d_{11} = 1.1000$   $n_{d8} = 1.88300$   $v_{d8} = 40.78$
$r_{12} = 28.3383$
$d_{12} = 0.2000$
$r_{13} = 5.9893$
$d_{13} = 7.3398$   $n_{d9} = 1.49700$   $v_{d9} = 81.61$
$r_{14} = -6.1436$
$d_{14} = 5.5333$   $n_{d10} = 1.71850$   $v_{d10} = 33.52$
$r_{15} = 3.1779$
$d_{15} = 2.8617$
$r_{16} = -4.2400$
$d_{16} = 0.9000$   $n_{d11} = 1.74000$   $v_{d11} = 31.71$

Embodiment 6 -continued $r_{17} = 9.3356$
$d_{17} = 2.5000$   $n_{d12} = 1.84666$   $v_{d12} = 23.78$
$r_{18} = -6.0462$

| thickness of cover glass plate (mm) | 2.5 | 3 | 3.5 |
|---|---|---|---|
| W.D. | 3.087 | 2.7 | 2.303 |
| $d_5$ | 2.738 | 1.779 | 0.55 |
| $d_9$ | 0.55 | 1.509 | 2.738 |

(1) $f_1/F = 2.49$
(2) $f_2/f_1 = 3.75$
(3) $|R_3/\Delta n|/F = 6.67$
(4) $v_{2p} - v_{2n} = 43.25$
(5) $n_{3n} - n_{3p} = 0.444$
(6) $v_{3p} - v_{3n} = 54.19$
(7) $D_{4f}/R_{4f} = 2.15$
(8) $v_{4B} = 27.75$

Embodiment 7

$F = 3, \beta = 60, N.A. = 0.7, W.D. = 3.28$ $r_1 = -11.6223$
$d_1 = 2.0003$   $n_{d1} = 1.78650$   $v_{d1} = 50.00$
$r_2 = -5.4525$
$d_2 = 0.2000$
$r_3 = 61.8844$
$d_3 = 1.0000$   $n_{d2} = 1.64450$   $v_{d2} = 40.82$
$r_4 = 15.9784$
$d_4 = 4.5000$   $n_{d3} = 1.43875$   $v_{d3} = 94.97$
$r_5 = -8.9897$
$d_5 = 2.4631$
$r_6 = 95.4796$
$d_6 = 2.7000$   $n_{d4} = 1.43875$   $v_{d4} = 94.97$
$r_7 = -17.5712$
$d_7 = 1.0000$   $n_{d5} = 1.61340$   $v_{d5} = 43.84$
$r_8 = 28.9861$
$d_8 = 3.3000$   $n_{d6} = 1.49700$   $v_{d6} = 81.61$
$r_9 = -15.8673$
$d_9 = 1.9850$
$r_{10} = 18.8671$
$d_{10} = 1.1000$   $n_{d7} = 1.61340$   $v_{d7} = 43.84$
$r_{11} = 10.3141$
$d_{11} = 1.5000$
$r_{12} = 10.6729$
$d_{12} = 4.8000$   $n_{d8} = 1.43875$   $v_{d8} = 94.97$
$r_{13} = -9.4265$
$d_{13} = 1.0000$   $n_{d9} = 1.78650$   $v_{d9} = 50.00$
$r_{14} = -23.3004$
$d_{14} = 0.2000$
$r_{15} = 7.0330$
$d_{15} = 6.4526$   $n_{d10} = 1.49700$   $v_{d10} = 81.61$
$r_{16} = -8.3944$
$d_{16} = 3.1409$   $n_{d11} = 1.50847$   $v_{d11} = 60.83$
$r_{17} = 2.8095$
$d_{17} = 3.5523$
$r_{18} = -8.7565$
$d_{18} = 1.0000$   $n_{d12} = 1.67650$   $v_{d12} = 37.54$
$r_{19} = 4.3890$
$d_{19} = 2.0000$   $n_{d13} = 1.80518$   $v_{d13} = 25.43$
$r_{20} = -96.2784$

| thickness of cover glass plate (mm) | 0.7 | 1.2 | 1.7 |
|---|---|---|---|
| W.D. | 3.561 | 3.28 | 3.004 |
| $d_5$ | 4.248 | 2.463 | 0.2 |
| $d_9$ | 0.2 | 1.985 | 4.248 |

(1) $f_1/F = 2.75$
(2) $f_2/f_1 = 5.38$
(3) $|R_3/\Delta n|/F = 2.13$

-continued

Embodiment 7

(4) $v_{2p} - v_{2n} = 37.77$
(5) $n_{3n} - n_{3p} = 0.17465$
(6) $v_{3p} - v_{3n} = 44.97$
(7) $D_{4f}/R_{4f} = 1.42$
(8) $v_{4B} = 31.49$ wherein the reference symbols $r_1, r_2, \ldots$ represent radii of curvature on surfaces of the respective lens element disposed in order from the object side, the reference symbols $d_1, d_2, \ldots$ designate thicknesses of the respective lens elements disposed in order from the object side and airspaces reserved therebetween, the reference symbols $n_1, n_2, \ldots$ denote refractive indices for the d-line of the respective lens elements disposed in order from the object side, and the reference symbols $v_1, v_2, \ldots$ represent Abbe's numbers of the respective lens elements disposed in order from the object side. Further, the reference symbol F designates a focal length of the objective lens system as a whole, the reference symbol β denotes a magnification of the objective lens system as a whole, the reference symbol N.A. represents a numerical aperture and the reference symbol W.D. designates a working distance (a distance as measured from a surface of a cover glass plate located on the object side to a vertex of an object side surface of the objective lens system). In the first, second, third, fifth and sixth embodiments, the cover glass plates are culture dishes made of a glass material which has a refractive index for the d-line $n_d=1.52289$ and an Abbe's number $v_d=59.89$. In the fourth and seventh embodiments, the cover glass plates are culture dishes made of a plastic material which has a refractive index for the d-line $n_d=1.59108$ and an Abbe's number $v_d=30.85$.

Figure 6:
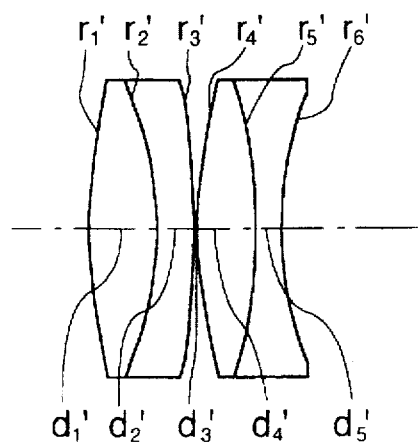
FIG. 6 shows a sectional view exemplifying an imaging lens system which is to be used in combination with each of the embodiments of the microscope objective lens system according to the present invention.

Each of the first through seventh embodiments of the microscope objective lens system according to the present invention described above is configured to allow a parallel light bundle to emerge therefrom for correcting aberrations or form an image at a predetermined infinite distance. Since each of these embodiments does not form an image at the finite distance, it is to be used in combination with an imaging lens system exemplified in a sectional form in FIG. 6.

This imaging lens system has the following numerical data:

| | | | |
|---|---|---|---|
| $r_1' = 68.7541$ | | | |
| | $d_1' = 7.7321$ | $n_{d1}' = 1.48749$ | $v_{d1}' = 70.20$ |
| $r_2' = -37.5679$ | | | |
| | $d_2' = 3.4742$ | $n_{d2}' = 1.80610$ | $v_{d2}' = 40.95$ |
| $r_3' = -102.8477$ | | | |
| | $d_3' = 0.6973$ | | |
| $r_4' = 84.3099$ | | | |
| | $d_4' = 6.0238$ | $n_{d3}' = 1.83400$ | $v_{d3}' = 37.16$ |
| $r_5' = -50.7100$ | | | |
| | $d_5' = 3.0298$ | $n_{d4}' = 1.64450$ | $v_{d4}' = 40.82$ |
| $r_6' = 40.6619$ | | | | wherein the reference symbols $r_1', r_2', \ldots$ represent radii of curvature on surfaces of respective lens elements disposed in order from the object side in the imaging lens system, the reference symbols $d_1', d_2', \ldots$ designate thicknesses of the respective lens elements disposed in order from the object side and airspaces reserved therebetween, the reference symbols $n_{d1}', n_{d2}', \ldots$ denote refractive indices for the d-line of the respective lens elements disposed in order from the object side, and the reference symbols $v_{d1}', v_{d2}', \ldots$ represent Abbe's number of the respective lens elements disposed in order from the object side.

A distance to be reserved between each of the embodiments described above and the imaging lens system shown in FIG. 6 is optionally selectable within a range from 50 mm to 170 mm.

I claim:

1. A microscope objective lens system, in order from the object side, comprising:

a first lens unit having a positive refractive power;

a second lens unit having a positive refractive power;

a third lens unit comprising a surface having a negative refractive power and strong divergent power; and a fourth lens unit having negative refractive power, wherein said first lens unit comprises a positive meniscus lens component having a concave surface on the object side and suitable for converting a light bundle coming from an object to be observed into a substantially parallel light bundle, said second lens unit comprises diverging cemented surfaces and is movable along an optical axis, and wherein said second lens unit is movable relative to said first lens unit and said third lens unit in conjunction with a thickness of a transparent plane parallel plate disposed between said first lens unit and a surface of said object.

2. A microscope objective lens system according to claim 1 satisfying the following conditions (1), (2) and (3):

$$2<f_1/F<3 \tag{1}$$

$$3<f_2/f_1<6 \tag{2}$$

$$1<|R_3/\Delta n|/F<12 \tag{3}$$

wherein the reference symbol F represents a focal length of the objective lens system as a whole, the reference symbol $f_1$ designates a focal length of said first lens unit, the reference symbol $f_2$ denotes a focal length of said second lens unit, the reference symbol $R_3$ represents a radius of curvature on a surface of at least one of surfaces having negative refractive powers used in said third lens unit, and the reference symbol $\Delta n$ designates refractive indices of media disposed before and after the refracting surface having the radius of curvature $R_3$.

3. A microscope objective lens system according to claim 1 or 2 wherein said second lens unit includes a cemented lens component which comprises at least one positive lens element and at least one negative lens element.

4. A microscope objective lens system according to claim 3 satisfying the following condition (4):

$$v_{2p}-v_{2n}>25 \tag{4}$$

wherein the reference symbol $v_{2p}$ represents an Abbe's number of the at least one positive lens element used in said second lens unit and the reference symbol $v_{2n}$ designates an Abbe's number of the at least one negative lens element used in said second lens unit.

5. A microscope objective lens system according to one of claim 1 or 2 wherein said third lens unit includes a cemented lens component which comprises at least one positive lens element and at least one negative lens element.

6. A microscope objective lens system according to claim 5 satisfying the following conditions (5) and (6):

$$n_{3n}-n_{3p}>0.1 \tag{5}$$

$$v_{3p}-v_{3n}>25 \tag{6}$$

wherein the reference symbol $n_{3p}$ represents a refractive index of at least one positive lens element used in said third lens unit, the reference symbol $n_{3n}$ designates a refractive index of the at least one negative lens element used in said third lens unit, the reference symbol $v_{3p}$ denotes an Abbe's number of the at least one positive lens element used in said third lens unit and the reference symbol $v_{3n}$ represents an Abbe's number of the at least one negative lens element used in said third lens unit.

7. A microscope objective lens system according to claim 1 or 2 wherein said fourth lens unit comprises a meniscus lens component having a convex surface on the object side and a meniscus lens component having a concave surface on the object side.

8. A microscope objective lens system according to claim 7 satisfying the following conditions (7) and (8):

$$D_4/R_{4f} > 1.2 \quad (7)$$

$$v_{4B} < 50 \quad (8)$$

wherein the reference symbol $D_{4f}$ represents thickness of a central portion of the meniscus lens component having a convex surface on the object side and disposed in said fourth lens unit, the reference symbol $R_{4f}$ designates a radius of curvature of the foremost surface of said fourth lens unit, and the reference symbol $v_{4B}$ denotes a mean value of Abbe's numbers of lens elements used for composing the meniscus lens component having the concave surface on the object side and disposed in said fourth lens unit.

9. A microscope objective lens system according to claim 4 wherein said third lens unit includes a cemented lens component which comprises at least one positive lens element and at least one negative lens element.

10. A microscope objective lens system according tu claim 9 satisfying the following conditions:

$$n_{3n} - n_{3p} > 0.1$$

$$v_{3p} - v_{3n} > 25$$

wherein the reference symbol $n_{3p}$ represents a refractive index of at least one positive lens element used in said third lens unit, the reference symbol n+3n+ designates a refractive index of the at least one negative lens element used in said third lens unit, the reference symbol $v_{3p}$ denotes an Abbe's number of the at least one positive lens element used in said third lens unit and the reference symbol $v_{3n}$ represents an Abbe's number of the at least one negative lens element used in said third lens unit.

11. A microscope objective lens system, in order from the object side, comprising:

a first lens unit having a positive refractive power;

a second lens unit having a positive refractive power;

a third lens unit having a negative refractive power; and a fourth lens unit having a negative refractive power, wherein said first lens unit comprises a positive meniscus lens component having a concave surface on the object side and has a function to convert a light bundle coming from an object to be observed into a substantially parallel light bundle, said second lens unit comprises diverging cemented surfaces and is movable along an optical axis, said third lens unit comprises a refractive surface having a strong diverging power, said second lens unit is movable relative to said first lens unit and said third lens unit in conjunction with a thickness of a transparent plane parallel plate disposed between said first lens unit and a surface of said object, and satisfying the following conditions:

$$2 < f_1/F < 3$$

$$3 < f_2/f_1 < 6$$

$$1 < |R_3/\Delta n|/F < 12$$

wherein the reference symbol F represents a focal length of the object lens system as a whole, the reference symbol $f_1$ designates a focal length of said first lens unit, the reference symbol $f_2$ denotes a focal length of said second lens unit, the reference symbol $R_3$ represents a radius of curvature on a surface of at least one surface having negative refractive power used in said third lens unit, and the reference symbol $\Delta n$ designates refractive indices of media disposed before and after the refracting surface having the radius of curvature $R_3$.

12. A microscope objective lens system according to claim 11 wherein said second lens unit includes a cemented lens component which comprises at least one positive lens element and at least one negative lens element.

13. A microscope objective lens system according to claim 12, satisfying the following condition:

$$v_{2p} - v_{2n} > 25$$

wherein the reference symbol $v_{2p}$ represents an Abbe's number of the at least one positive lens element used in said second lens unit and the reference symbol $v_{2n}$ designates an Abbe's number of the at least one negative lens element used in said second lens unit.

14. A microscope objective lens system according to claim 11 or 13 wherein said third lens unit includes a cemented lens component which comprises at least one positive lens element and at least one negative lens element.

15. A microscope objective lens system according to claim 14, satisfying the following conditions:

$$n_{3n} - n_{3p} > 0.1$$

$$v_{3p} - v_{3n} > 25$$

wherein the reference symbol $n_{3p}$ represents a refractive index of at least one positive lens element used in said third lens unit, the reference symbol $n_{3n}$ designates a refractive index of the at least one negative lens element used in said third lens unit, the reference symbol $v_{3p}$ denotes an Abbe's number of the at least one positive lens element used in said third lens unit and the reference symbol $v_{3n}$ represents an Abbe's number of the at least one negative lens element used in said third lens unit.

16. A microscope objective lens system according to claim 11, wherein said fourth lens unit comprises a meniscus lens component having a convex surface on the object side and a meniscus lens component having a concave surface on the object side.

17. A microscope objective lens system according to claim 16, satisfying the following conditions:

$$D_4/R_{4f} > 1.2$$

$$v_{4B} < 50$$

wherein the reference symbol $D_{4f}$ represents a thickness of a central portion of the meniscus lens component having a convex surface on the object side and disposed in said fourth lens unit, the reference symbol $R_{4f}$ designates a radius of curvature of the foremost surface of said fourth lens unit, and the reference symbol $v_{4B}$ denotes a mean value of Abbe's numbers of lens elements used for composing the meniscus lens component having the concave surface on the object side and disposed in said fourth lens unit.

* * * * *